Sept. 15, 1925.  
O. F. ALTENBERN ET AL  
EAVES TROUGH COVERING  
Filed June 2, 1924  
1,553,426  
2 Sheets-Sheet 1

Inventors  
Oscar F. Altenbern  
James C. Hill  
By *Lancaster and Allwine*  
Attorneys

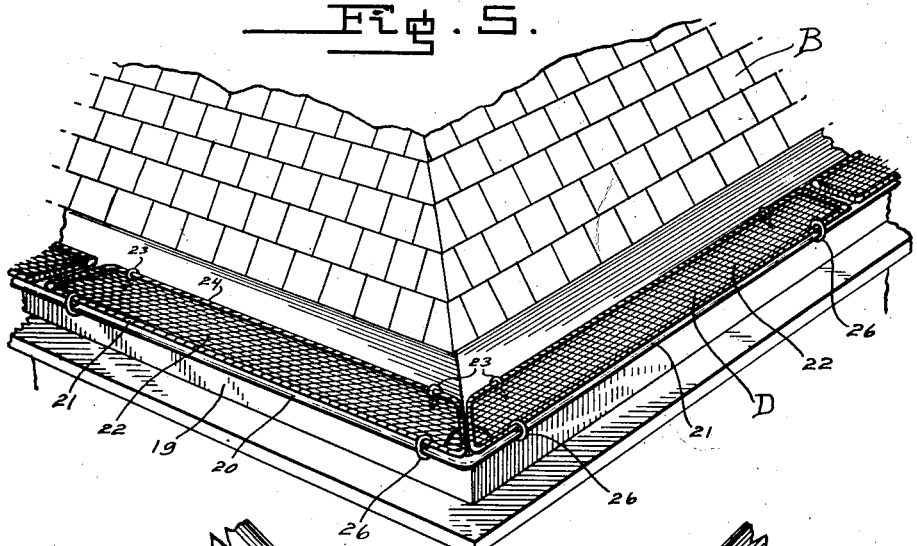
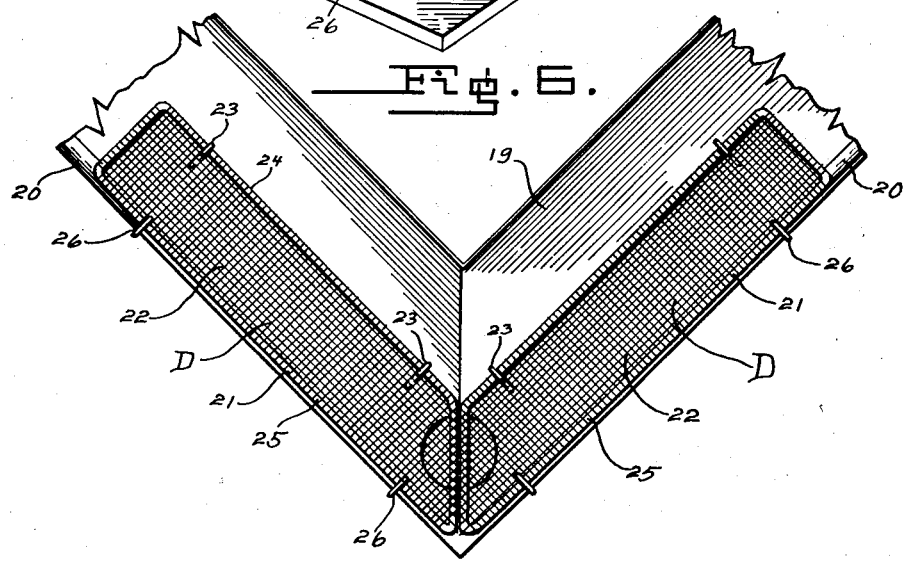
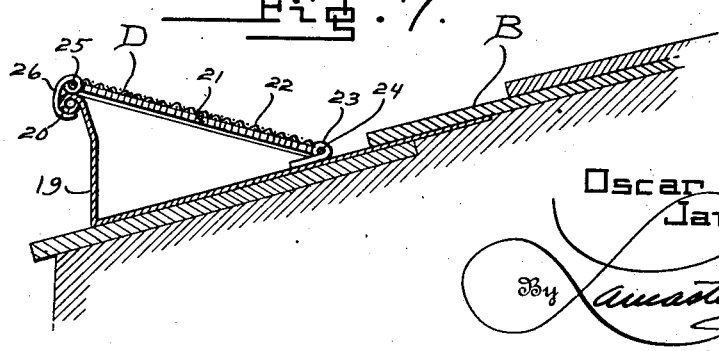

Patented Sept. 15, 1925.

1,553,426

UNITED STATES PATENT OFFICE.

OSCAR F. ALTENBERN AND JAMES C. HILL, OF FREEPORT, ILLINOIS.

EAVES-TROUGH COVERING.

Application filed June 2, 1924. Serial No. 717,344.

*To all whom it may concern:*

Be it known that we, OSCAR F. ALTENBERN and JAMES C. HILL, citizens of the United States, residing at Freeport, in the county of Stephenson, State of Illinois, have invented certain new and useful Improvements in an Eaves-Trough Covering, of which the following is a specification.

The present invention relates to eaves troughs, and more specifically to a protecting cover for the same.

It is well known that eaves troughs quite frequently fill up with matter which is picked up by the wind and deposited upon the roof, or by matter carried by birds. Buildings are also at times erected near growing timber which constantly subjects open eaves troughs to falling leaves which cause the troughs to overflow, and quite frequently clog up the conductor pipes thereby rendering the troughs worthless. This necessitates the frequent cleaning of the troughs and as in many cases this procedure is a very dangerous and expensive one, the troughs are neglected which soon results in the rusting out of the troughs and conductor pipes.

Therefore the primary object of this invention is to provide a novel protecting cover for eaves troughs whereby foreign matter, which would tend to prevent the successful operation of the trough, will be effectively excluded therefrom.

A further object of the invention is to provide a novel eaves trough covering which may be readily installed upon eaves troughs now in use, or may be incorporated as a part of eaves troughs to be sold as a unit.

A still further object of the invention is to provide protecting covers for eaves troughs, embodying features whereby the covers may be readily swung free of the trough for permitting of the repairing or painting of the troughs to which they are attached.

Other objects and advantages of the invention will appear in the following detailed description, taken in connection with the accompanying drawings, forming a part of this specification, and in which drawings, Figure 1 is a perspective view of a portion of a building and showing my improved protecting cover applied to an eaves trough carried thereby.

Figure 5 is a perspective view showing the improved protecting cover as applied to another type of eaves trough from that as shown in Figures 1 to 4 inclusive, and showing a slightly modified form of the cover.

Figure 6 is a top plan view of two corner sections of the cover and trough as disclosed in Figure 5, and Figure 7 is an enlarged transverse section through the same.

Referring to the drawings in detail and wherein like characters designate corresponding parts throughout the several views, A designates a building provided with an inclined roof B; C designates an eaves trough, and D an improved protecting cover therefor.

Figure 1:
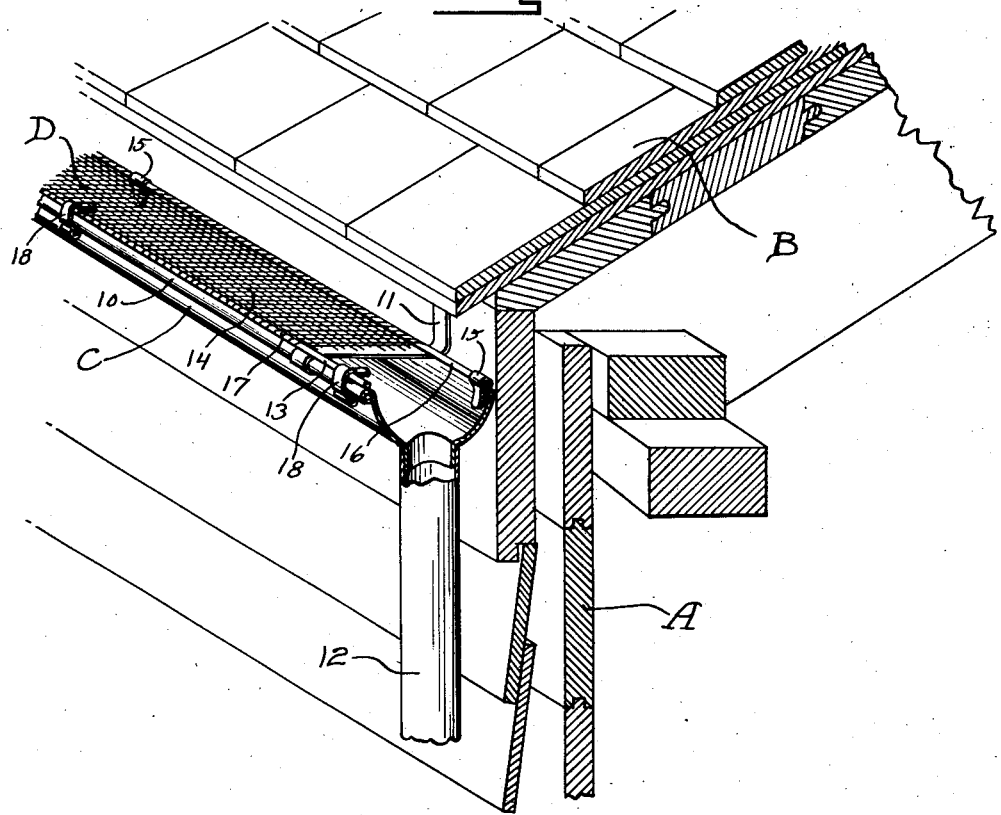
Figure 2:
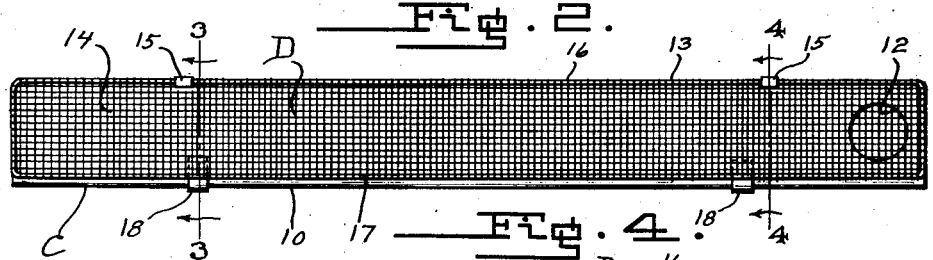
Figure 2 is a top plan view of an eaves trough embodying my improved cover.
Figure 4:
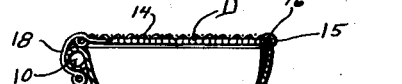
Figure 4 is an enlarged transverse section on the line 4—4 of Figure 2.
Figure 3:
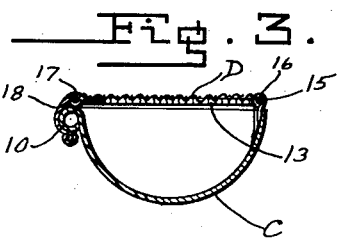
Figure 3 is an enlarged transverse section on the line 3—3 of Figure 2.

Referring first to Figures 1 to 4 inclusive of the drawings; the eaves trough C is of the ordinary well known construction being provided at its outer edge with an outturned longitudinally extending bead 10, and adapted to be supported beneath the eaves of the roof B as by straps or hangers 11. The trough C is provided with the usual conductor pipe 12 whereby the water running into the trough from the roof B may be carried away from the building.

The protecting covers D which are adapted to cover the troughs C, and which may be made in various widths and lengths, preferably consist of rectangular shaped frames 13 for supporting a wire gauze or netting 14 which may have its transverse and longitudinally extending strands secured to the frame in any suitable manner. These frames may be made from round metal rods, bent to the desired shape and secured at their abutting ends as by welding or the like. Metal straps 15 which are coiled centrally of their ends about the rear frame rod 16, are adapted to have their engaging free end portions secured as by soldering or riveting, to the inner rear face of the trough C, and adjacent the upper portion thereof for hingedly connecting the cover to the trough. Rigidly secured to the outer frame rod 17, are yieldable retaining clips 18 which are adapted to be sprung into position beneath the trough bead 10 in a manner for retaining the cover D in operative overlying relation with the eaves trough C. These yieldable or spring retaining clips 18 which may be soldered or otherwise secured to the rod 17, will rigidly hold the covers against accidental displacement, and yet permit of the covers being readily swung to an open position for permitting of painting or repair work being done to the trough.

Referring to Figures 5 to 7 inclusive, which show the protecting covers as applied to a cornice gutter 19 provided with the usual outer bead 20; the frame 21 for supporting a wire netting 22, are of like construction as that shown in Figures 1 to 4 inclusive. In this type of protecting cover, the hinge means consist of elements 23 having one end thereof coiled about the rear frame rod 24 for providing a hinge joint and having their free ends soldered to the upper face of the gutter 19 as clearly shown in Figure 7. Hingedly carried by the outer frame rod 25, are hook members 26 which are adapted to be swung into holding engagement beneath the head 20 for preventing accidental swinging of the covers upon the pivot members 23. Figures 5 and 6 show the manner in which the end portions of the frames may be shaped at corners of various angles for preventing any possibility of foreign matter passing through the covers at their abutting end portions.

The object in so providing a rigid resilient clip as disclosed in Figures 1 to 4, is that these covers may be accurately made as to width for fitting standard size eaves trough and therefore the resilient clip may be efficiently sprung about the bead 10; while in the form as shown in Figures 5 to 7, these types of gutters vary in size and construction, thereby necessitating the use of differently shaped hooks which may be readily swung over the outer portion of the gutter or cornice for retaining the cover in an effective operative position.

While these covers have been described as consisting of sections which may be secured to troughs now being used, it is also an object of the invention to incorporate these covers in the making of new troughs, to be sold as a unit with the troughs.

Changes in detail may be made without departing from the spirit or scope of the invention; but,

We claim:

1. The combination with an eaves trough having an outturned longitudinally extending portion, of a protecting cover therefore comprising a frame and a wire network rigidly carried thereby, means carried by one edge of said frame for hingedly connecting the frame to said trough adjacent its margin opposite to said outturned portion, and retaining means carried by the opposite edge of said frame adapted for locking engagement beneath the outturned portion of said trough.

2. The combination with an eaves trough having an outturned longitudinally extending portion, of a protecting cover therefore comprising a frame and a wire network rigidly carried thereby, hinge means for connecting the frame to said trough adjacent its margin opposite to said outturned portion, comprising members pivotally carried by one longitudinal edge of said frame and disposed between certain transverse strands of the network for preventing longitudinal movement of the cover, and retaining means carried by the opposite longitudinal edge of said frame adapted for locking engagement beneath the outturned portion of said trough.

3. A protecting cover for that type of eaves trough being substantially semi-circular shaped in cross section and having an outturned longitudinally extending bead formed at one edge thereof, comprising a rectangular shaped frame and a wire network rigidly carried thereby, metal strips coiled centrally of their ends about one longitudinal edge of said frame, the engaging free end portions of which are adapted to be secured to the inner face of said trough adjacent its margin opposite to said outturned bead for hingedly connecting the frame to said trough, and yieldable retaining clips rigidly secured to the opposite longitudinal edge of the frame and adapted to be sprung over the outturned bead of the trough for retaining the cover in operative relation with respect to the trough.

OSCAR F. ALTENBERN.
JAMES C. HILL.